(12) United States Patent
Nishio et al.

(10) Patent No.: US 7,977,620 B2
(45) Date of Patent: Jul. 12, 2011

(54) LASER-WELDING METHOD FOR STACKED WORKPIECES

(75) Inventors: Masahiro Nishio, Toyota (JP); Yuichi Tsukeshiba, Toyota (JP); Hiroki Fujimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 264 days.

(21) Appl. No.: 12/305,696

(22) PCT Filed: Apr. 8, 2008

(86) PCT No.: PCT/JP2008/057227
§ 371 (c)(1),
(2), (4) Date: Dec. 19, 2008

(87) PCT Pub. No.: WO2008/133063
PCT Pub. Date: Nov. 6, 2008

(65) Prior Publication Data
US 2010/0230390 A1    Sep. 16, 2010

(30) Foreign Application Priority Data

Apr. 16, 2007 (JP) ................................ 2007-107135

(51) Int. Cl.
*B23K 26/00* (2006.01)
*H01J 40/14* (2006.01)

(52) U.S. Cl. .............. 250/216; 219/121.61; 219/121.63; 219/121.64

(58) Field of Classification Search .................. 250/216, 250/221; 219/121.6, 121.61, 121.63, 121.64, 219/121.85
See application file for complete search history.

(56) References Cited

U.S. PATENT DOCUMENTS
2006/0237402 A1    10/2006   Nagashima et al.

FOREIGN PATENT DOCUMENTS
| JP | 2002 219590 | 8/2002 |
| JP | 2006 224134 | 8/2006 |
| JP | 2006 297464 | 11/2006 |
| WO | WO 2007036797 A1 * | 4/2007 |

* cited by examiner

*Primary Examiner* — Kevin Pyo
(74) *Attorney, Agent, or Firm* — Oblon, Spivak, McClelland, Maier & Neustadt, L.L.P.

(57) ABSTRACT

A laser welding method for stacked workpieces. A laser irradiation diameter that is irradiated on a surface of one workpiece among two stacked workpieces is set such that a laser irradiation diameter at a weld ending-edge portion is equal to or greater than approximately 1.5 times a laser irradiation diameter at a weld starting-edge portion. Thus, at the weld ending-edge portion, the material is melted in a wider area compared to a conventional example, and therefore, the melted material is supplied to the center portion of the weld ending-edge portion while the weld ending-edge portion is solidifying. As a result, a depth of the recess at the weld ending-edge portion can be made shallow enough to guarantee the welding quality of each of the workpieces.

4 Claims, 3 Drawing Sheets

BACKGROUND ART

LASER-WELDING METHOD FOR STACKED WORKPIECES

TECHNICAL FIELD

The present invention relates to a laser welding method for stacked workpieces, in which, for example, plate-shaped workpieces are stacked in plurality, and each of the workpieces is welded by irradiating a substantially circular laser onto a surface of a workpiece that is positioned at one end.

BACKGROUND ART

Generally, as shown in FIG. 5, in a laser welding of stacked workpieces, for example, a laser head 3 is disposed above a surface of one workpiece 1 among two stacked plate-shaped workpieces 1 and 2, and while irradiating a substantially circular laser 4 from the laser head 3 toward the surface of the workpiece 1, the laser head 3 is moved linearly with respect to each of the workpieces 1 and 2, whereby each of the workpieces 1 and 2 is welded. Reference numeral 4 denotes a path of the laser.

In addition, a laser irradiation diameter A on the surface of the workpiece 1 is substantially identical at a weld starting-edge portion, halfway from the weld starting-edge portion to a weld ending-edge portion, and at the weld ending-edge portion. In order to improve an efficiency of laser energy, the smallest focusing beam diameter (focused state) is set so that an energy intensity of the laser 4 is maximized, and a penetrating capacity by the laser 4 is maximized.

However, as shown in FIG. 6(b), in the conventional laser welding method described above, inconveniences occur such as a recess 5 being formed in the surface of the workpiece 1 and a through hole being formed that passes through the workpiece 1 at the weld ending-edge portion after the welding has been completed. The bonding strength and the sealing characteristics of each of the workpieces 1 and 2 are reduced, and it is not possible to guarantee the welding quality of the workpieces 1 and 2. Note that the portion that is shown by reference numeral 6 denotes a portion that has solidified after having been melted by a laser.

The reason that the recess 5 or the through hole is formed in the surface of the workpiece 1 at the weld ending-edge portion of the workpieces 1 and 2 is that, in such welding using the laser irradiation, a material that has melted simultaneously with the formation of a keyhole 20 due to the laser irradiation forms a weld while being driven into the keyhole 20 toward the back side thereof with respect to the direction of the forward movement, and then the melted material that has been driven into the keyhole 20 cools and gradually solidifies.

However, at the weld ending-edge portion, the recess 5 or the through hole may be formed in the center portion when the material is not sufficient to completely fill the inside of the keyhole 20 because sufficient material has not been supplied to the inside of the keyhole 20 from the forward direction, and the melted material becomes cooler than the surroundings and contracts while solidifying.

Note that Patent Document 1 discloses a stacked laser welding method for zinc plated copper plates in which the beam shape at the irradiation position is an elliptical shape that has a major axis that is parallel to the welding line and a minor axis that is perpendicular thereto.

Patent Document 1: Japanese Patent Application Publication No. JP-A-2002-219590

DISCLOSURE OF THE INVENTION

Problems to be Solved by the Invention

In the invention of Patent Document 1 described above, because the beam is formed into an elliptical shape, spattering of the melted metal and blowholes are greatly reduced in comparison to the conventional case. However, at the weld ending-edge portion, it is not possible to eliminate inconveniences such as recesses, through holes, and the like that are formed in the workpiece surface.

The present invention has been devised in consideration of such points. Thus, it is an object of the present invention to provide a laser welding method for stacked workpieces that enables the reduction of inconveniences such as recesses and through holes that are formed in the workpiece surface at the weld ending-edge portion when plate-shaped workpieces that are stacked in plurality are welded by irradiating a laser on the surface of the workpiece that is positioned at one end.

Means for Solving the Problems

In order to solve the problems described above, the laser welding method for stacked workpieces according to the present invention is characterized in that a laser irradiation diameter that is irradiated on a surface of the workpiece such that a laser irradiation diameter at a weld ending-edge portion is larger than a laser irradiation diameter at a weld starting-edge portion.

Thereby, a depth of a recess that is formed in the workpiece surface at the weld ending-edge portion can be significantly reduced compared to the conventional example.

Note that each of the modes of the laser welding method for stacked workpieces of the present invention and the operation thereof will be explained in detail in the following sections (modes of the invention).

Exemplary Forms of the Invention

Below, several exemplary forms of the invention for which patent claims are perceived to be allowable in the present application (below, referred to "claimable invention") will be illustrated, and these forms will be explained. Note that each of the forms, similar to each of the claims, is divided into sections, a number is attached to each of the sections, and disclosure thereof is carried out with citing other sections, as necessary. This is only to facilitate the understanding of the claimable invention, and there is no effect that limits the combination of structural elements that structure the claimable invention to the content disclosed in each of the following sections. That is, the claimable invention should be understood with reference to the disclosures that accompany each of the sections, embodiments and the like. In accordance with this interpretation, an exemplary form in which other structural elements are further added to an exemplary form of each section and an exemplary form in which structural elements are eliminated from an exemplary form of each section can serve as an exemplary form of the claimable invention. Moreover, in each of the following sections, sections (1) and (2) correspond to claims 1 and 2, respectively, and section (6) corresponds to claim 3.

(1) A laser welding method for stacked workpieces is characterized in that a laser irradiation diameter that is irradiated on a surface of the workpiece is set such that a laser irradiation diameter at a weld ending-edge portion is larger than a laser irradiation diameter at a weld starting-edge portion.

Therefore, in the laser welding method for stacked workpieces in section (1), the laser irradiation at the weld ending-edge portion is defocused so that the laser irradiation diameter that is irradiated on the workpiece surface is set such that the laser irradiation diameter at the weld ending-edge portion is larger than the laser irradiation diameter at the weld starting-edge portion. Thus, at the weld ending-edge portion, the material is melted in a wider area compared to the conventional example, and therefore, the melted material is supplied to the center portion of the weld ending-edge portion while the weld ending-edge portion is solidifying. As a result, the depth of the recess at the weld ending-edge portion can be reduced compared to the conventional example.

(2) The laser welding method for stacked workpieces as disclosed in section (1), characterized in that a laser irradiation diameter halfway from the weld starting-edge portion to the weld ending-edge portion is set to be substantially identical to the laser irradiation diameter at the weld starting-edge portion.

Therefore, in the laser welding method for stacked workpieces in section (2), by setting the laser irradiation diameter halfway from the weld starting-edge portion to the weld ending-edge portion to be substantially identical to the laser irradiation diameter at the weld starting-edge portion, a high penetrating power is maintained without reducing the laser energy halfway from the weld starting-edge portion to the weld ending-edge portion so that the bonding strength between each of the workpieces is not reduced.

(3) The laser welding method for stacked workpieces as disclosed in section (1), characterized in that the laser irradiation diameter in the interval from the weld starting-edge portion to the weld ending-edge portion is gradually widened from the weld starting-edge portion toward the weld ending-edge portion.

Therefore, in the laser welding method for stacked workpieces in section (3), the laser irradiation diameter at the weld ending-edge portion is set larger than the laser irradiation diameter at the weld starting-edge portion by gradually increasing the laser irradiation diameter from the weld starting-edge portion toward the weld ending-edge portion.

(4) The laser welding method for stacked workpieces as disclosed in any one of section (1) to section (3), characterized in that the laser irradiation diameter is appropriately set by changing the distance of the laser head from the workpiece surface.

(5) The laser welding method for stacked workpieces as disclosed in any one of section (1) to section (3), characterized in that the laser irradiation diameter is appropriately set by changing the distance of the laser focusing unit inside the laser head from the workpiece surface.

Therefore, in the laser welding method for stacked workpieces in section (4) and section (5), as means for making the laser irradiation diameter at the weld ending-edge portion larger than the laser irradiation diameter at the weld starting-edge portion and defocusing the laser irradiation at the weld ending-edge portion, one of first means that changes the distance between the laser head and the surface of the workpiece and second means that changes the distance between the laser focusing unit inside the laser head and the surface of the workpiece is appropriately selected and used.

(6) The laser welding method for stacked workpieces as disclosed in any one of section (1) to section (5), characterized in that the laser irradiation diameter at the weld ending-edge portion is set equal to or greater than 1.5 times the laser irradiation diameter at the weld starting-edge portion.

Therefore, in the laser welding method for stacked workpieces in section (6), at the weld ending-edge portion, the depth of the recess that is formed in the workpiece surface can be made shallow enough to guarantee the welding quality of each of the workpieces.

(7) The laser welding method for stacked workpieces as disclosed in any one of section (1) to section (6), characterized in that the workpieces are plate-shaped, and are welded after two or three have been stacked.

Therefore, in the laser welding method for stacked workpieces in section (7), when laser welding is carried out after two or three plate-shaped workpieces have been stacked, it is possible to make the depth of the recess at the weld ending-edge portion in the surface of the workpiece positioned at one end shallow.

Figure 1:
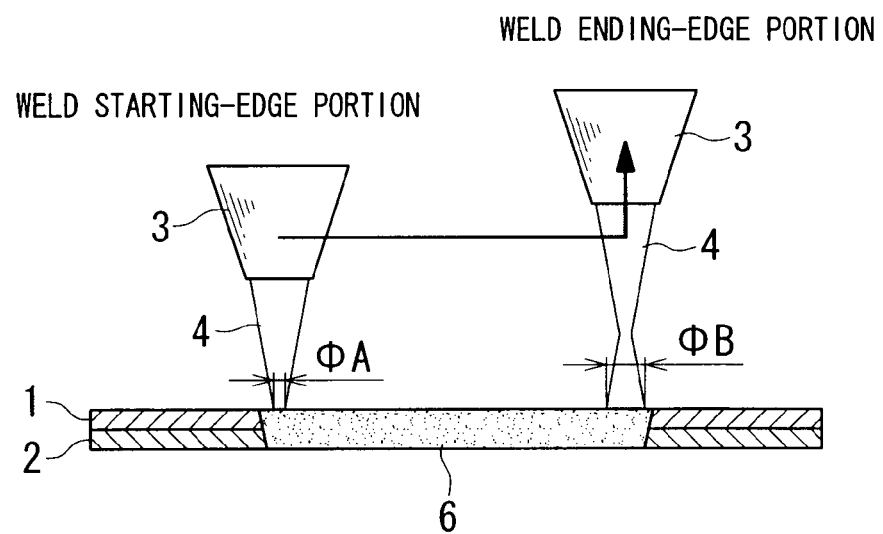
FIG. 1 is a schematic diagram for explaining a laser welding method for stacked workpieces according to an embodiment of the present invention.

DESCRIPTION OF REFERENCE NUMERALS 1, 2 workpiece
3 laser head
4 laser
9 laser focusing unit
A, B laser irradiation diameter

BEST MODES FOR CARRYING OUT THE INVENTION

Below, best modes for carrying out the invention will be explained in detail with reference to FIG. 1 to FIG. 4. Note that members that are identical to those of the conventional example are explained by using identical reference numerals.

As shown in FIG. 1, a laser welding method for stacked workpieces according to an embodiment of the present invention is one in which two plate-shaped workpieces 1 and 2 are stacked, and each of the workpieces 1 and 2 is welded by irradiating a substantially circular laser on a surface of the workpiece 1. A laser irradiation diameter that irradiates the surface of the workpiece 1 is set such that a laser irradiation diameter B at a weld ending-edge portion becomes larger than a laser irradiation diameter A at a weld starting-edge portion.

Note that the present laser welding method for stacked workpieces is used in a mode in which the two plate-shaped workpieces 1 and 2 are stacked and welded, but the method can be used in a mode in which three plate-shaped workpieces are stacked and welded.

Below, the present laser welding method for stacked workpieces will be explained in detail with reference to FIG. 1 to FIG. 4.

As shown in FIG. 1, a laser head 3 is disposed above the workpiece 1 among the two stacked workpieces 1 and 2, and the laser head 3 is held by an arm portion of a multi-jointed robot (not illustrated) and can be moved linearly with respect to each of the workpieces.

Note that in the present embodiment, the two plate-shaped workpieces 1 and 2 that are to be welded are made of steel plates that are used, for example, in an automobile body, and the respective thicknesses of the workpieces 1 and 2 are within a range of 0.6 mm to 3 mm. In addition, a laser output is set within a range of 2 kW to 6 kW, and a movement speed (welding speed) of the laser head 3 depends on the thicknesses of each of the workpieces and the like. Specifically, in the case in which the laser output is 2 kW, the laser irradiation diameter at the surface of the workpiece 1 at the weld starting-edge portion is 0.6 mm, and the thickness of each of the workpieces 1 and 2 is 0.7 mm, the movement speed is set to 2 m/min.

Figure 3:
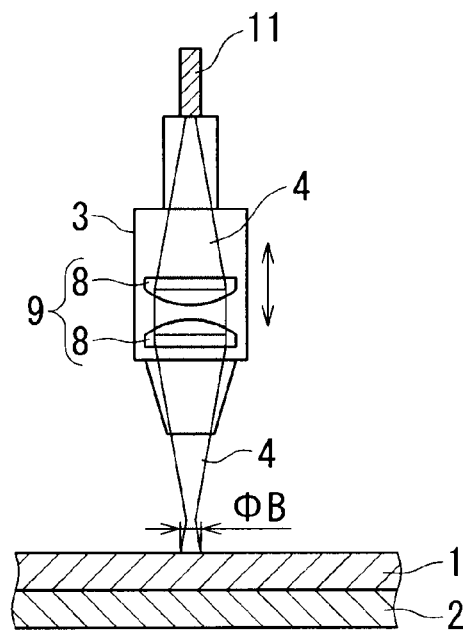
FIG. 3 is a schematic diagram showing first means for setting a laser irradiation diameter.

As shown in FIG. 3, a laser focusing unit 9 is disposed inside the laser head 3. The laser focusing unit 9 focuses a laser 4 from a light emitting source 11 and is structured by opposing convex lenses 8.

The laser 4 from the light emitting source 11 passes through the laser focusing unit 9, whereby the laser 4 is radiated from the laser head 3 such that the substantially circular irradiation diameter thereof gradually narrows toward the surface of the workpiece 1. In this manner, while radiating the laser 4 from the laser head 3 toward the surface of the workpiece 1, each of the workpieces 1 and 2 is welded by moving the laser head 3 linearly from the weld starting-edge portion to the weld ending-edge portion.

Thus, in order to improve the efficiency of a laser energy, the laser irradiation diameter A at the surface of the workpiece 1 at the weld starting-edge portion is set to be the smallest focus diameter (focused state) so that an energy density of the laser 4 is maximized. Note that in the present embodiment, the laser irradiation diameter A at the weld ending-edge portion is set to 0.6 mm.

In addition, the laser irradiation diameter at the surface of the workpiece 1 halfway from the weld starting-edge portion to the weld ending-edge portion is set to be substantially identical to the laser irradiation diameter A at the weld starting-edge portion.

Furthermore, at the weld ending-edge portion, the laser irradiation from the laser head 3 at the surface of the workpiece 1 is defocused. Specifically, in the present embodiment, the laser irradiation at the surface of the workpiece 1 is defocused by moving the laser head 3 away from the surface of the workpiece 1, and the laser irradiation diameter B of the weld ending-edge portion is set to 0.9 mm. In the present embodiment, the laser irradiation diameter B at the weld ending-edge portion is set equal to or greater than 1.5 times the laser irradiation diameter A at the weld starting-edge portion.

Figure 2:
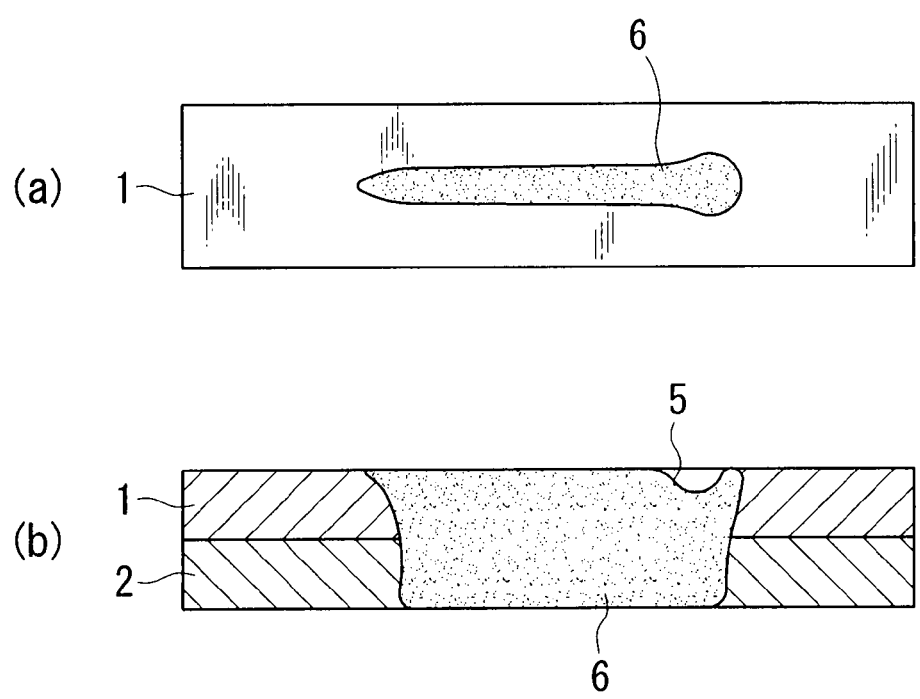
FIG. 2($a$) is a plane view of a surface of one workpiece, and (b) is a longitudinal cross-sectional view after welding of each of the workpieces has been completed.

In this manner, the laser irradiation diameter that irradiates the surface of the workpiece 1 is set such that the laser irradiation diameter B at the weld ending-edge portion is equal to or greater than 1.5 times the laser irradiation diameter A at the weld starting-edge portion. Thus, as shown in FIG. 2, the material is melted in a wider area at the weld ending-edge portion compared to the conventional example, and therefore, the melted material is supplied to the center portion of the weld ending-edge portion while the weld ending-edge portion is solidifying. As a result, a depth of the recess 5 that is formed in the surface of the workpiece 1 at the weld ending-edge portion can be significantly reduced.

At the weld ending-edge portion of the workpieces 1 and 2, first and second means, explained below, are used as means for making the laser irradiation diameter B at the weld ending-edge portion larger than the laser irradiation diameter A at the weld starting-edge portion and for defocusing the laser irradiation at the weld ending-edge portion.

The first means vertically moves the laser head 3 so as to change the distance between the laser head 3 and the surface of the workpiece 1, as shown in FIG. 3 where the first means is employed in the present embodiment.

Figure 4:
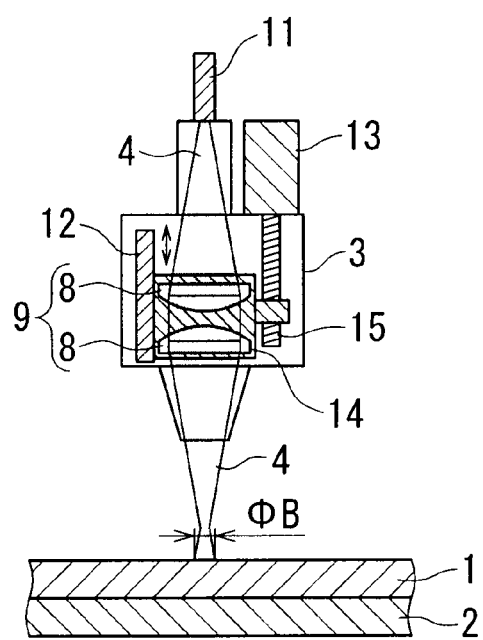
FIG. 4 is a schematic diagram showing second means for setting the laser irradiation diameter.
Figure 5:
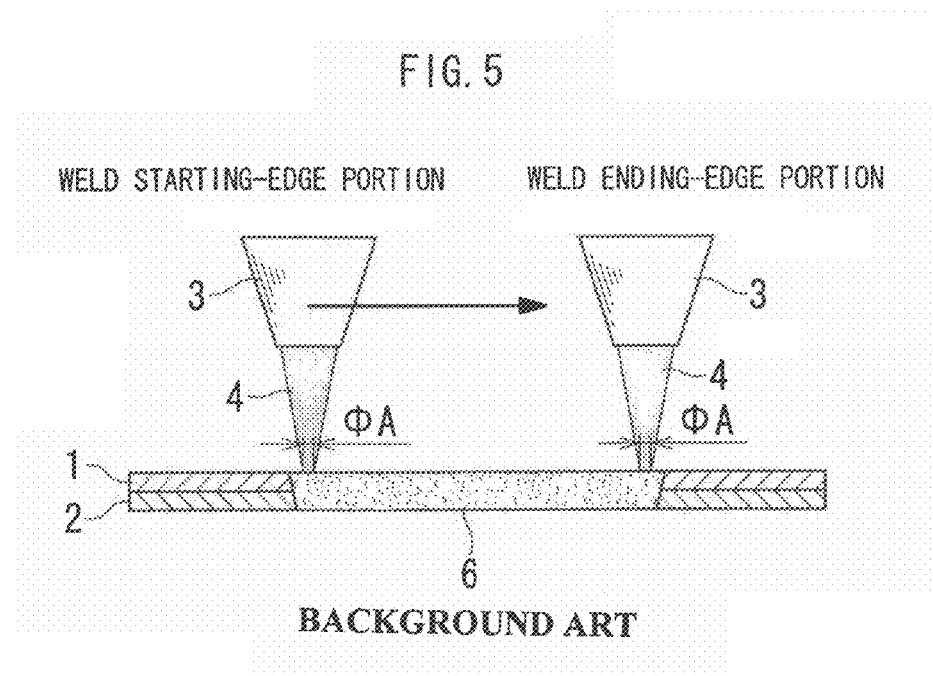
FIG. 5 is a schematic diagram for explaining a conventional laser welding method for stacked workpieces.
Figure 6:
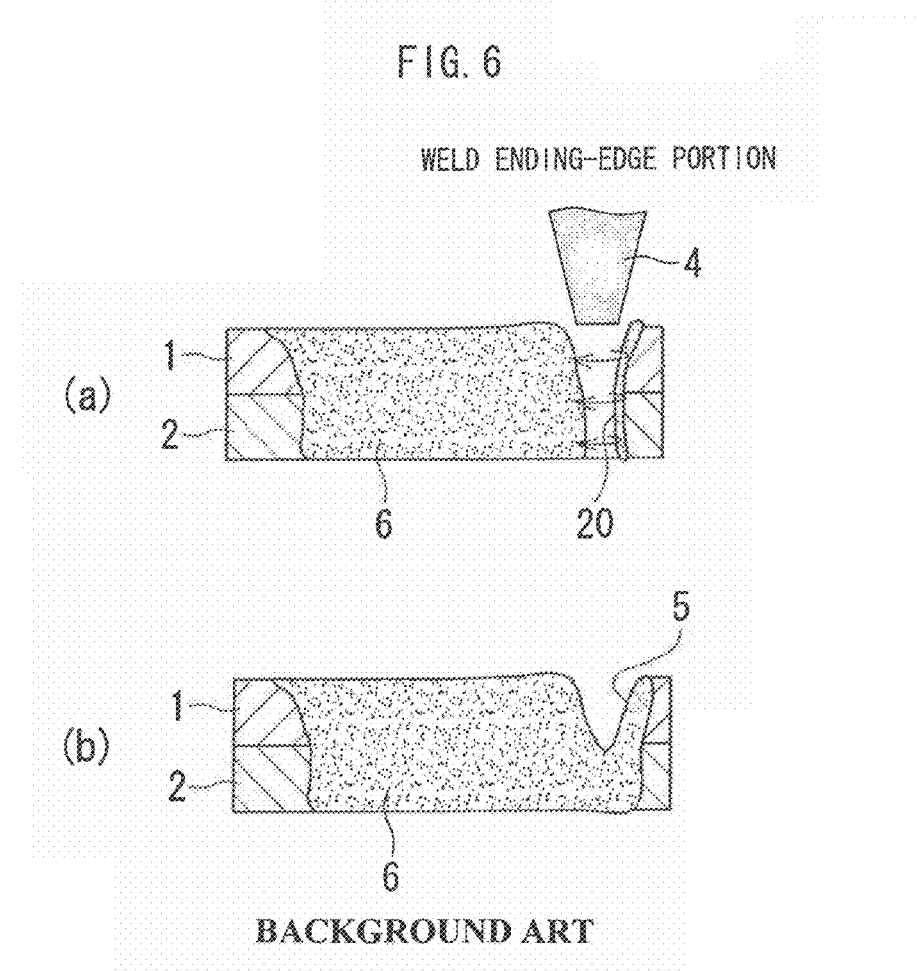
FIG. 6($a$) is a longitudinal cross-sectional view that shows a state in which each of the workpieces is welded by using the conventional laser welding method for stacked workpieces, and (b) is a longitudinal cross-sectional view after the welding of each of the workpieces has been completed.

The second means changes the distance between the laser focusing unit 9 which is disposed so as to move freely in a vertical direction inside the laser head 3, and the surface of the workpiece 1, as shown in FIG. 4. Needless to say, in the second means, it is not necessary to move the laser head 3 vertically.

Specifically, in the second means, the pair of convex lenses 8 and 8 constituting the laser focusing unit 9 inside the laser head 3 are integrated by using a frame body 14. One end of the frame body 14 is guided by a linear guide 12 that extends in a vertical direction, while another end of the frame body 14 is threaded on a ball screw 15 that is linked to a shaft portion of a servomotor 13. In addition, by driving the servomotor 13, the frame 14 that integrates the pair of convex lenses 8 and 8 is moved vertically inside the laser head 3, and thus the distance to the surface of the workpiece 1 is changed.

Note that in the laser welding method for stacked workpieces according to the embodiment of the present invention, taking into consideration the weld quality, the laser irradiation diameter at the surface of the workpiece 1 halfway from the weld starting-edge portion to the weld ending-edge portion is set to be substantially identical to the laser irradiation diameter A at the weld starting-edge portion. However, the laser irradiation diameter may gradually widen from the weld starting-edge portion toward the weld ending-edge portion.

As explained above, according to the laser welding method for stacked workpieces according to the embodiment of the present invention, the laser irradiation diameter that is irradiated on the surface of the workpiece 1 among two stacked workpieces 1 and 2 is set such that the laser irradiation diameter B at the weld ending-edge portion is equal to or greater than 1.5 times the laser irradiation diameter A at the weld starting-edge portion. Thus, at the weld ending-edge portion, the material is melted in a wider area compared to the conventional example, and therefore, the melted material is supplied to the center portion of the weld ending-edge portion while the weld ending-edge portion is solidifying. As a result, the depth of the recess 5 at the weld ending-edge portion can be made shallow enough to guarantee the welding quality of each of the workpieces 1 and 2.

In addition, in the laser welding method for stacked workpieces according to the embodiment of the present invention, for the laser irradiation diameter that is irradiated on the surface of the workpiece 1, the laser irradiation diameter halfway from the weld starting-edge portion to the weld ending-edge portion is set to be identical to the laser irradiation diameter A at the weld starting-edge portion. Therefore, a high penetrating power is maintained without reducing the laser energy within this range so that the welding quality is not reduced.

Furthermore, the present laser welding method for stacked workpieces can be realized by using existing equipment and does not require new equipment. Therefore, expenses related to capital investment are not necessary.

The invention claimed is:

1. A laser welding method for stacked workpieces, comprising:
    irradiating on a surface of a workpiece of the stacked workpieces using a laser that is set such that a laser irradiation diameter at a weld ending-edge portion is larger than a laser irradiation diameter at a weld starting-edge portion and that is set to have a laser power at the weld ending-edge portion which melts a material in a wider area at the weld ending-edge portion than at the weld starting-edge portion.

2. The laser welding method for stacked workpieces according to claim 1, wherein a laser irradiation diameter halfway from the weld starting-edge portion to the weld ending-edge portion is set to be substantially identical to the laser irradiation diameter at the weld starting-edge portion.

3. The laser welding method for stacked workpieces according to claim 1, wherein the laser irradiation diameter at the weld ending-edge portion is set equal to or greater than 1.5 times the laser irradiation diameter at the weld starting-edge portion.

4. The laser welding method for stacked workpieces according to claim 2, wherein the laser irradiation diameter at the weld ending-edge portion is set equal to or greater than 1.5 times the laser irradiation diameter at the weld starting-edge portion.

* * * * *